(12) United States Patent
Coccia et al.

(10) Patent No.: US 10,693,740 B2
(45) Date of Patent: Jun. 23, 2020

(54) DATA TRANSFORMATION OF PERFORMANCE STATISTICS AND TICKET INFORMATION FOR NETWORK DEVICES FOR USE IN MACHINE LEARNING MODELS

(71) Applicant: Accenture Global Solutions Limited, Dublin (IE)

(72) Inventors: Davide Coccia, Monteprandone (IT); Davide Guglielmo Bellini, Milan (IT)

(73) Assignee: Accenture Global Solutions Limited, Dublin (IE)

( * ) Notice: Subject to any disclaimer, the term of this patent is extended or adjusted under 35 U.S.C. 154(b) by 168 days.

(21) Appl. No.: 15/834,845

(22) Filed: Dec. 7, 2017

(65) Prior Publication Data

US 2019/0182120 A1    Jun. 13, 2019

(51) Int. Cl.
*G06F 13/00* (2006.01)
*H04L 12/24* (2006.01)
(Continued)

(52) U.S. Cl.
CPC ............ *H04L 41/147* (2013.01); *G06N 5/04* (2013.01); *G06N 20/00* (2019.01); *G06Q 10/06* (2013.01);
(Continued)

(58) Field of Classification Search
CPC ....... G06F 13/00; G06F 16/29; G06K 9/6256; G06K 9/6269; G06N 5/025; G06N 7/005; G06N 99/005; G06N 5/04; G06N 20/00; G06N 99/00; H04L 12/2602; H04L 29/06; H04L 29/08072; H04L 41/22; H04L 43/00; H04L 12/24; H04L 12/26; H04L 41/145; H04L 41/147; H04L 41/5074;
(Continued)

(56) References Cited

U.S. PATENT DOCUMENTS 8,682,812 B1   3/2014  Ranjan et al.
9,439,081 B1   9/2016  Knebl et al.
(Continued)

OTHER PUBLICATIONS

Extended European Search Report for Application No. EP18208748.6, dated Mar. 6, 2019, 10 pages.
(Continued)

*Primary Examiner* — Robert B Harrell
(74) *Attorney, Agent, or Firm* — Harrity & Harrity, LLP

(57) ABSTRACT

A device may receive one or more data models that have been trained using a first set of values that are in a format capable of being processed by the one or more data models. The first set of values may be associated with a set of historical network performance indicators relating to a set of network devices. The device may receive network data that includes network ticket information and performance statistics for the one or more network devices. The device may determine a set of network performance indicators relating to the one or more network devices. The device may convert the set of network performance indicators into a second set of values that are in the format capable of being processed by the one or more data models. The device may use the second set of values to generate one or more recommendations associated with improving network performance.

20 Claims, 7 Drawing Sheets

(51) Int. Cl.
  *H04L 12/26* (2006.01)
  *G06N 5/04* (2006.01)
  *G06N 20/00* (2019.01)
  *G06Q 10/06* (2012.01)
  *G06Q 10/10* (2012.01)

(52) U.S. Cl.
  CPC ... *G06Q 10/0639* (2013.01); *G06Q 10/06393* (2013.01); *G06Q 10/101* (2013.01); *H04L 41/145* (2013.01); *H04L 41/5074* (2013.01); *H04L 43/08* (2013.01)

(58) Field of Classification Search
  CPC ...... H04L 43/08; G06Q 10/06; G06Q 10/101; G06Q 10/0639; G06Q 10/06393
  USPC .............................................. 706/12; 709/224
  See application file for complete search history.

(56) References Cited

U.S. PATENT DOCUMENTS

| | | |
|---|---|---|
| 2017/0019291 A1 | 1/2017 | Tapia et al. |
| 2017/0103339 A1* | 4/2017 | Pandit ................ G06F 16/29 |
| 2017/0264501 A1 | 9/2017 | Mathen et al. |
| 2017/0339022 A1 | 11/2017 | Hegde et al. |

OTHER PUBLICATIONS

Yufeng G., "The 7 Steps of Machine Learning—Towards Data Science," Aug. 31, 2017, 16 pages. [retrieved on Feb. 25, 2019], Retrieved from the Internet: [URL:https://towardsdatascience.com/the-7-steps-of-machine-learning-2877d7e5548e].

Yao N., et al., "Reducing Congestion Over Hotspot Clusters in WCDMA Networks", IEEE Wireless Communications and Networking Conference, Mar. 1, 2007, pp. 3731-3735, XP031097821.

* cited by examiner

DATA TRANSFORMATION OF PERFORMANCE STATISTICS AND TICKET INFORMATION FOR NETWORK DEVICES FOR USE IN MACHINE LEARNING MODELS

BACKGROUND

Machine learning allows computers to process data to make predictions. For example, a machine learning tool may use a data model to process data to make classifications, predictions, forecasting decisions, and/or the like.

SUMMARY

According to some possible implementations, a device may obtain historical network data associated with a set of network devices. The historical network data may include at least one of historical network ticket information or historical performance statistics relating to the set of network devices. The device may determine a set of historical network performance indicators for one or more groups of network devices, of the set of network devices, by analyzing the historical network data. The device may train one or more data models based on the historical network performance indicators. The device may receive, after training the one or more data models, network data for one or more network devices of the set of network devices. The network data may be received periodically over an interval and may include at least one of network ticket information or performance statistics relating to the one or more network devices. The device may determine a set of network performance indicators that are associated with the one or more network devices, of the set of network devices, by analyzing the network data. The device may generate, based on the network performance indicators and the trained one or more data models, one or more recommendations associated with improving network performance. The device may perform, based on the one or more recommendations, one or more actions associated with improving network performance.

According to some possible implementations, a method may include receiving, by a device, one or more data models that have been trained using a first set of values that are in a format capable of being processed by the one or more data models. The first set of values may be associated with a set of historical network performance indicators that relate to a set of network devices. The method may include receiving, by the device, network data for one or more network devices of the set of network devices. The network data may include network ticket information and performance statistics relating to the one or more network devices. The method may include determining, by the device, a set of network performance indicators that are associated with the one or more network devices by analyzing the network data. The method may include converting, by the device, the set of network performance indicators into a second set of values that are in the format capable of being processed by the one or more data models. The method may include generating, by the device and by providing the second set of values as input to the one or more data models, one or more recommendations associated with improving network performance. The method may include performing, by the device and based on the one or more recommendations, one or more actions associated with improving network performance.

According to some possible implementations, a non-transitory computer-readable medium may store one or more instructions that, when executed by one or more processors, cause the one or more processors to receive one or more data models that have been trained using one or more machine learning techniques and a first set of values that are in a format capable of being processed by the one or more data models. The first set of values may be associated with a set of historical network performance indicators that relate to a set of network devices. The one or more instructions may cause the one or more processors to receive network data for one or more network devices of the set of network devices. The network data may include at least one of network ticket information relating to the one or more network devices or performance statistics relating to the one or more network devices. The one or more instructions may cause the one or more processors to determine a set of network performance indicators that are associated with the one or more network devices, of the set of network devices, by analyzing the network data. The one or more instructions may cause the one or more processors to convert the set of network performance indicators into a second set of values that are in the format capable of being processed by the one or more data models. The one or more instructions may cause the one or more processors to generate, by providing the second set of values as input to the one or more data models, one or more recommendations associated with improving network performance. The one or more recommendations may include at least one of a first recommendation to modify a number of network devices used to support traffic flow, a second recommendation to modify an allocation of resources associated with at least one of the one or more network devices, or a third recommendation to reroute traffic flow associated with the set of network devices. The one or more instructions may cause the one or more processors to perform, based on the one or more recommendations, one or more actions associated with improving network performance.

DETAILED DESCRIPTION

Figure 1A:
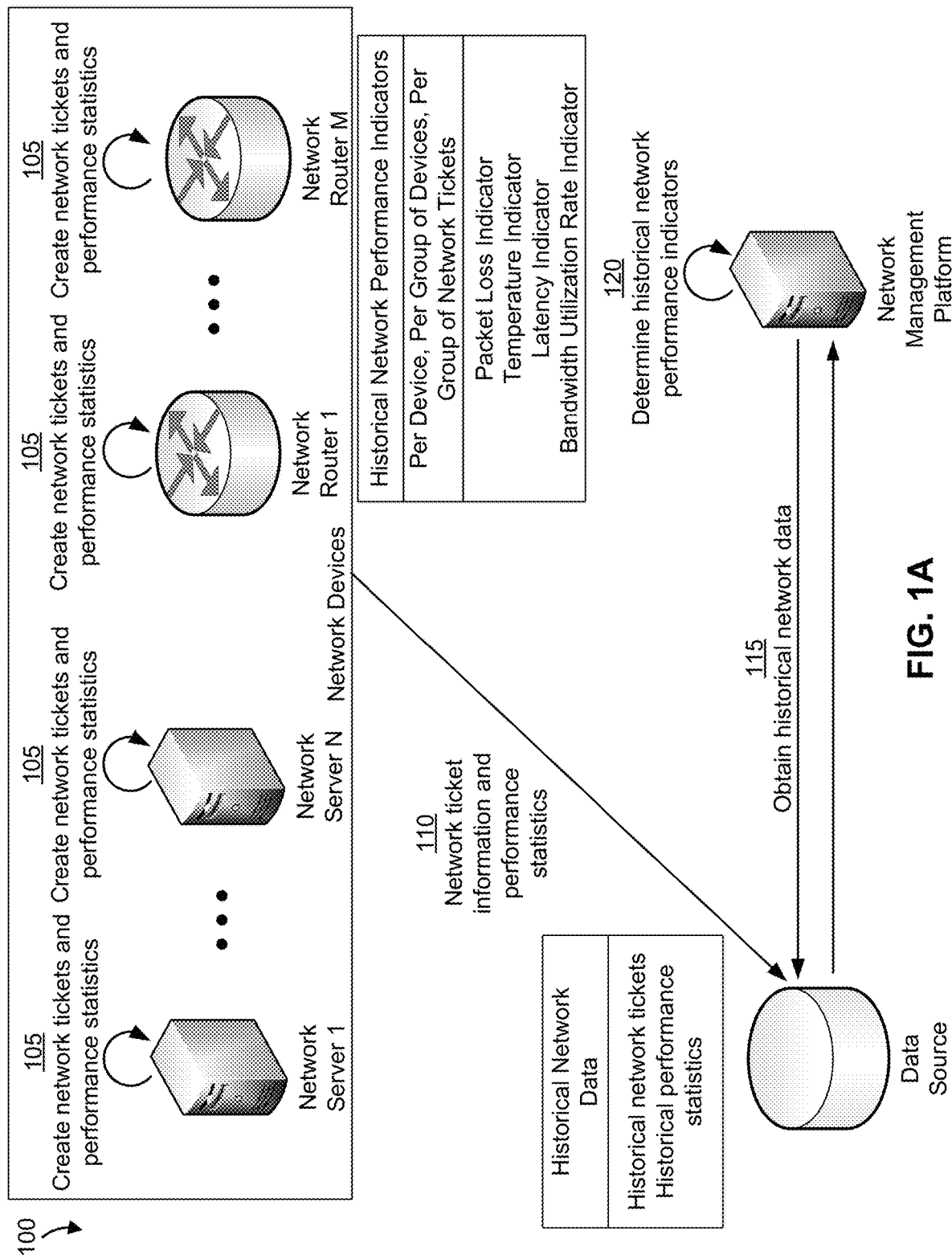
FIGS. 1A-1D are diagrams of an overview of an example implementation described herein.

The following detailed description of example implementations refers to the accompanying drawings. The same reference numbers in different drawings may identify the same or similar elements.

As demand for data services continues to increase, network service providers may need to support large volumes of traffic flow over one or more networks. Without improvements to network infrastructure, increases to the number of devices accessing the one or more networks and/or increases in data usage per device may lead to decreases in quality of service, increases in network latency and packet loss, and/or the like.

To improve network infrastructure and processes that manage traffic flow, a network service provider may utilize machine learning. However, using a machine learning model to score live data may be difficult when the data received is of different types of values, is in different formats, is of different data types, and/or the like. Additionally, using the machine learning model to score live data may generate a prediction based on that particular instance of live data, but might not provide a prediction regarding a stream of data that is coming in over an interval.

Some implementations described herein provide a network management platform to transform data into a format that is capable of being processed by machine learning models, and using the machine learning models to make network management decisions. For example, the network management platform may obtain performance statistics and/or network ticket information associated with one or more network devices. In this case, the network management platform may process the performance statistics and/or the network ticket information using a natural language processing technique to determine a set of network performance indicators. In other cases, network performance indicators can be determined locally on each network device, and sent to the network management platform.

Additionally, the network management platform may convert the set of network performance indicators into a set of values that are in a format that is capable of being processed by one or more data models. Furthermore, the network management platform may provide the set of values as input to the one or more data models to cause the one or more data models to output coefficient values that may be used to make and implement network management decisions.

By using machine learning to generate recommendations that may be implemented to improve network performance, the network management platform conserves network resources by determining an efficient and effective allocation of resources. Furthermore, the network management platform conserves processing resources by predicting and preventing network faults. For example, by predicting a network fault (e.g., a server crashing, a threshold amount of packet loss occurring, etc.), and performing preventative measures needed to ensure that the network fault never occurs, the network management platform conserves processing resources that might otherwise be used to fix the network fault in real-time, processing resources that might be used to reallocate network resources during the network fault, and/or the like. Moreover, using machine learning to generate recommendations that may be implemented to improve network performance prevents disruptions to service, thereby improving customer service.

FIGS. 1A-1D are diagrams of an overview of an example implementation 100 described herein. As shown in FIGS. 1A-1D, example implementation 100 may include a network management platform that uses machine learning to train one or more data models that may be used to generate recommendations associated with improving network performance.

As shown in FIG. 1A, and by reference number 105, each network device, of a set of network devices, may generate one or more network tickets and/or one or more performance statistics. For example, each network device may generate a network ticket if a network alarm is triggered, and one or more network alarms may trigger over a particular time period (e.g., an hour, a day, a month, etc.). In this case, a sensor (e.g., a hardware-based sensor, a software-based sensor, etc.) may monitor a network device and/or traffic flow associated with the network device, and a network alarm may trigger if a particular metric or value monitored by the sensor satisfies or fails to satisfy a particular threshold level of performance.

Additionally, if the network alarm is triggered, the network device hosting the sensor may generate a network ticket. A network ticket may identify a particular performance issue, such as by identifying an issue relating to packet loss, an issue relating to temperature (e.g., temperature of a component of a network device), an issue relating to latency, an issue relating to bandwidth, an issue relating to memory, and/or the like.

Furthermore, each network device may, regardless of whether a network ticket is created, monitor performance statistics. For example, a network device may monitor statistics relating to packet loss, temperature of components of the network device, latency and/or bandwidth metrics relating to traffic flow through the network device, and/or the like.

As shown by reference number 110, the set of network devices may be configured to provide the network ticket information and the performance statistics to a data source. The data source may store the network ticket information and the performance statistics as historical network data. The historical network data may include historical network ticket information and historical performance statistics relating to packet loss, temperature, latency, bandwidth, and/or the like.

As shown by reference number 115, the network management platform may obtain the historical network data from the data source. For example, the network management platform may query a set of historical performance statistics and/or a set of historical network tickets for further processing.

As shown by reference number 120, the network management platform may determine a set of historical network performance indicators. For example, the network management platform may analyze the set of historical network data to determine a set of historical network performance indicators for each network device, for groups of network devices (e.g., based on geographic location, based on type of network device, etc.), for groups of historical network data (e.g., an indicator may aggregate different types of historical network data), and/or the like.

The set of historical network performance indicators may include a packet loss indicator, a temperature indicator, a latency indicator, a bandwidth utilization rate indicator, and/or the like. For example, a packet loss indicator may indicate average packet loss for a network device or for a group of network devices over an interval. As another example, a temperature indicator may aggregate historical network data relating to different temperature-related issues, such as a historical network data indicating that a particular component of a network device is overheating, a historical network data indicating that a fan within the network device has malfunctioned, and/or the like.

In this way, the network management platform is able to determine a set of historical network performance indicators that may be used to train one or more data models, as described further herein.

Figure 1B:
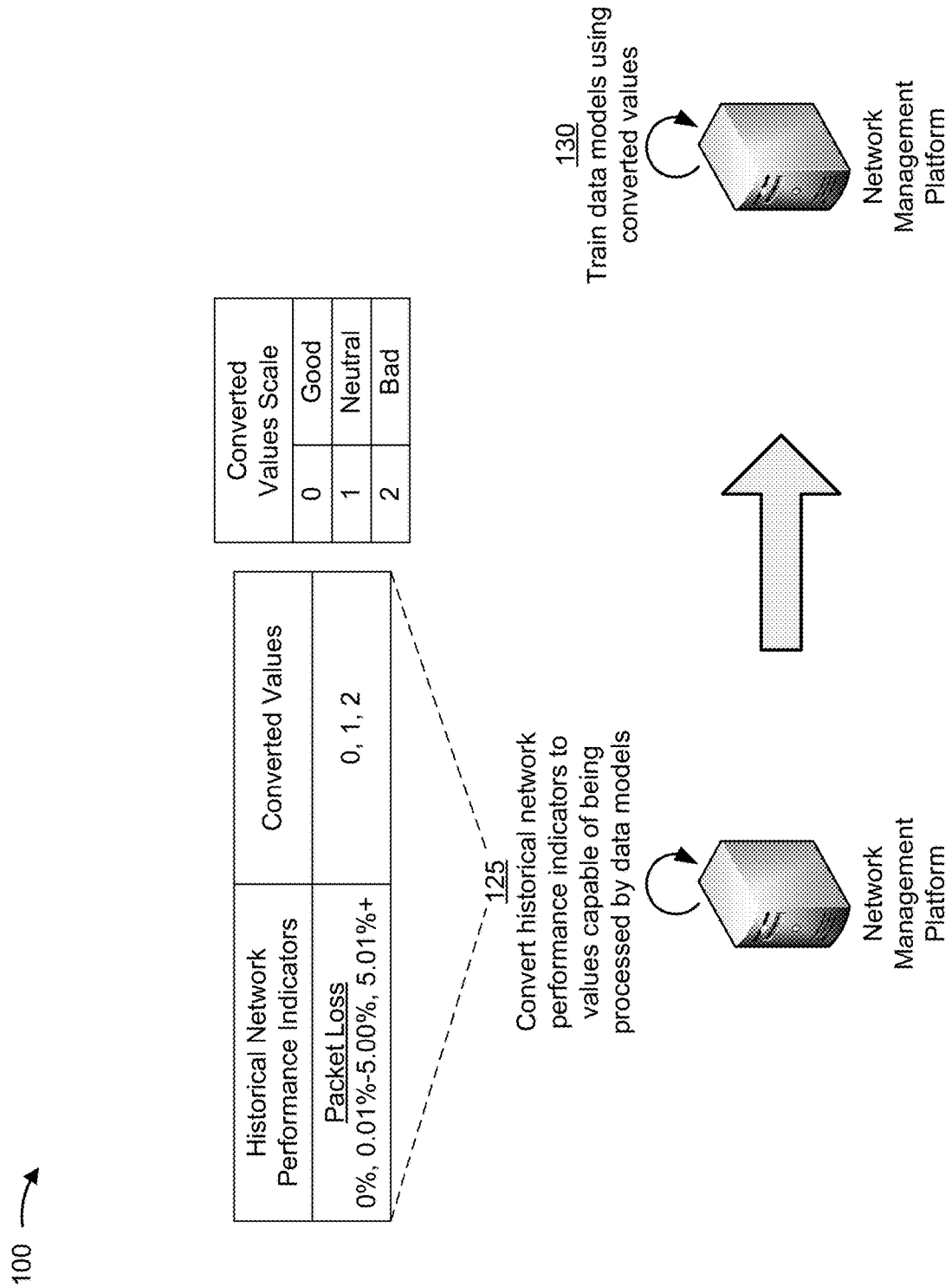

As shown in FIG. 1B, and by reference number 125, the network management platform may convert the set of historical network performance indicators into a set of values that are capable of being processed by one or more data models. For example, a domain expert may, for each type of historical network performance indicator, associate ranges of historical network performance indicator values with values that are capable of being processed by a data model.

Additionally, or alternatively, the network management platform may automatically identify the ranges of historical network performance indicator values (e.g., by mining publicly available data, by analyzing a set of historical network performance indicator values, etc.), and may assign values to each range.

Shown as an example, the network management platform may convert a packet loss indicator value to a value of 0, 1, or 2, based on whether the packet loss indicator value is 0%, between 0.01% and 5.00%, or more than 5%. In practice, the network management platform may determine thousands, even millions of different historical network performance indicator values, and may convert the thousands, or the millions of different historical network performance indicator values to the set of values that are capable of being processed by the one or more data models (e.g., one or more statistical models).

As shown by reference number 130, the network management platform may train the one or more data models using the converted set of values. For example, the network management platform may use the converted set of values in conjunction with a location identification technique, a forecasting technique, an anomaly detection technique, and/or the like, to allow the one or more data models to be able to output values that may be used to make network management decisions, as described further herein.

In this way, the network management platform is able to convert historical network performance indicators into a set of values that is capable of being used by data models, and may use the set of values to train the data models.

Figure 1C:
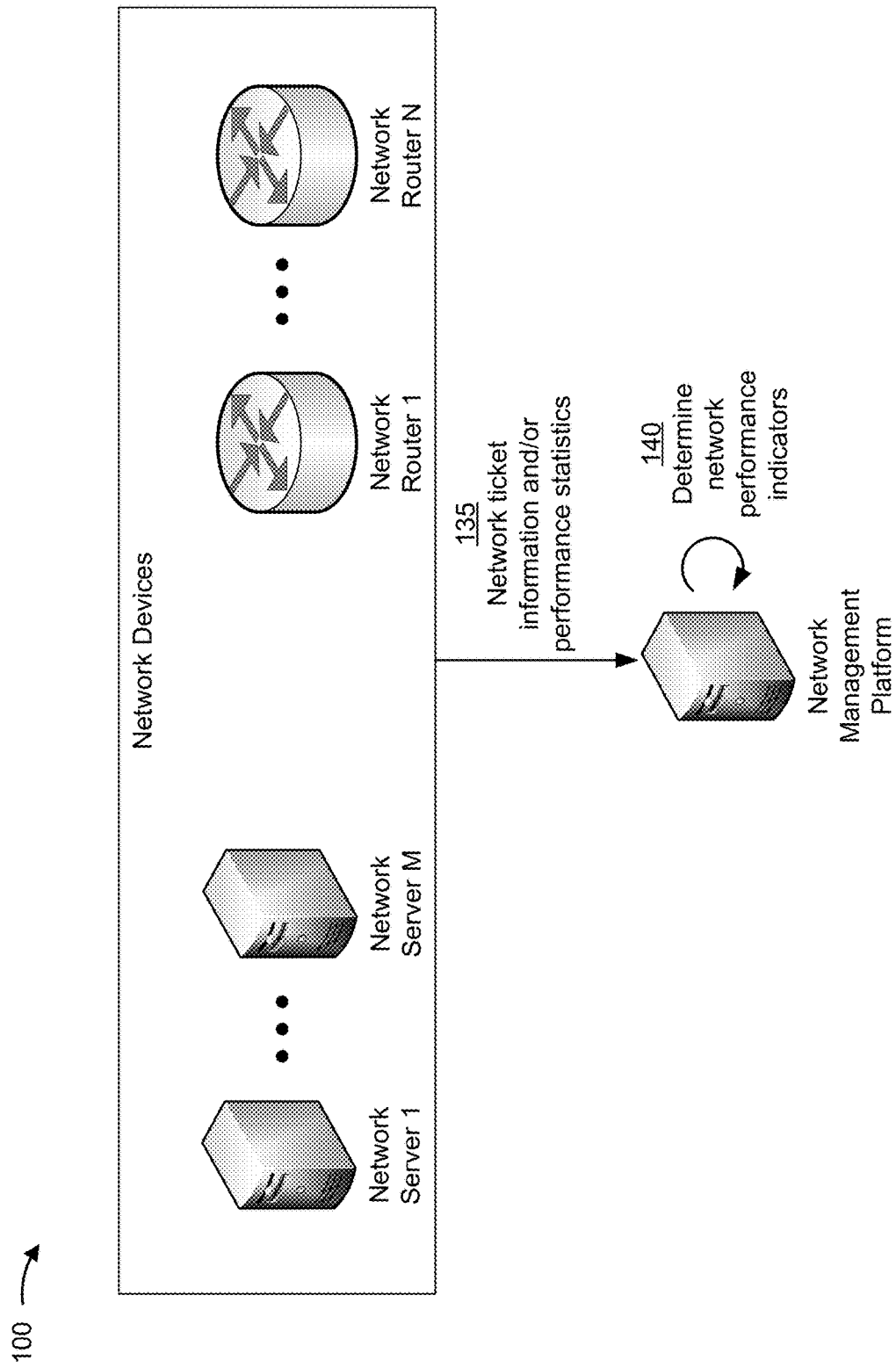

As shown in FIG. 1C, and by reference number 135, the network management platform may receive network ticket information and/or performance statistics. For example, the network management platform may receive a set of network tickets and/or a set of performance statistics from the set of network devices periodically throughout an interval (e.g., ten seconds, a minute, an hour, etc.). In some cases, the set of network devices may provide the network ticket information and/or the performance statistics to one or more intermediary devices (e.g., the data source, a server, a network device, etc.), and the one or more intermediary devices may forward the network ticket information and/or the performance statistics to the network management platform.

As shown by reference number 140, the network management platform may analyze the network ticket information and/or the performance statistics to determine a set of network performance indicators. For example, the network management platform may determine a set of network performance indicators, in the same manner described above with respect to determining historical network performance indicators.

In this way, the network management platform is able to receive network ticket information and/or performance statistics in real-time (e.g., real-time relative to a time at which the network tickets and/or the performance statistics are created and provided). Furthermore, the network management platform is able to aggregate the network ticket information and/or the performance statistics during an interval, and is able to analyze the network ticket information and/or the performance statistics to determine a set of forecasted network performance indicators or a recommended action.

Figure 1D:
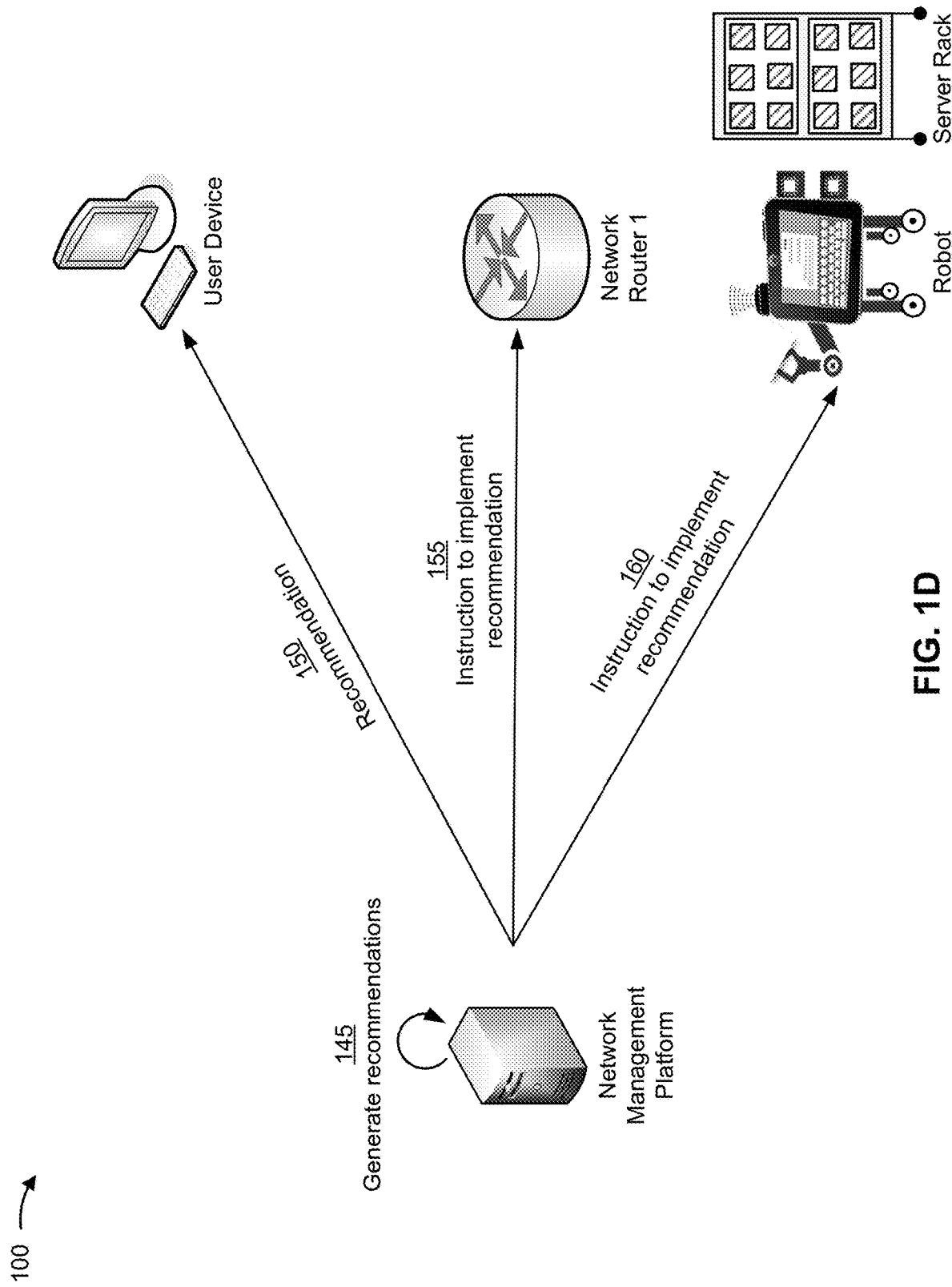

As shown in FIG. 1D, and by reference number 145, the network management platform may generate one or more recommendations. For example, the network management platform may provide the set of network performance indicators as input to the one or more data models to cause the one or more data models to output values associated with particular recommendations that may be implemented to improve network performance. The one or more recommendations may include a recommendation to add a network device to a particular location or to remove the network device from the particular location (e.g., a location may be a particular server rack, a particular data center, a particular geographic location, etc.), to allocate resources to the network device or from the network device, to allocate resources from the network device to another network device, to route traffic to the network device or route traffic away from the network device, and/or the like.

As shown by reference number 150, the network management platform may provide a recommendation to a user device. For example, the network management platform may provide a recommendation to a user device associated with a technician to instruct the technician to implement the recommendation.

As shown by reference number 155, the network management platform may provide an instruction to implement a recommendation to network router 1. For example, the network management platform may, using an application programming interface (API), provide an instruction to allocate resources to network router 1 or to deallocate resources from network router 1.

As shown by reference number 160, the network management platform may provide an instruction to implement a recommendation to a robot. For example, a robot may be deployed inside of a data center, and may receive the instruction to implement the recommendation. In this case, for example, the robot may automatically add a device to a server rack, modify resources at the server rack, and/or the like.

In this way, the network management platform is able to receive, aggregate, and process real-time network tickets and/or performance statistics to enable one or more data models to generate recommendations that may be implemented to improve network performance. Furthermore, by implementing the one or more recommendations, the network management platform conserves processing resources that might otherwise be used to perform error correction techniques, to process customer service requests that are made during network faults, and/or the like.

As indicated above, FIGS. 1A-1D are provided merely as an example. Other examples are possible and may differ from what was described with regard to FIGS. 1A-1D.

Figure 2:
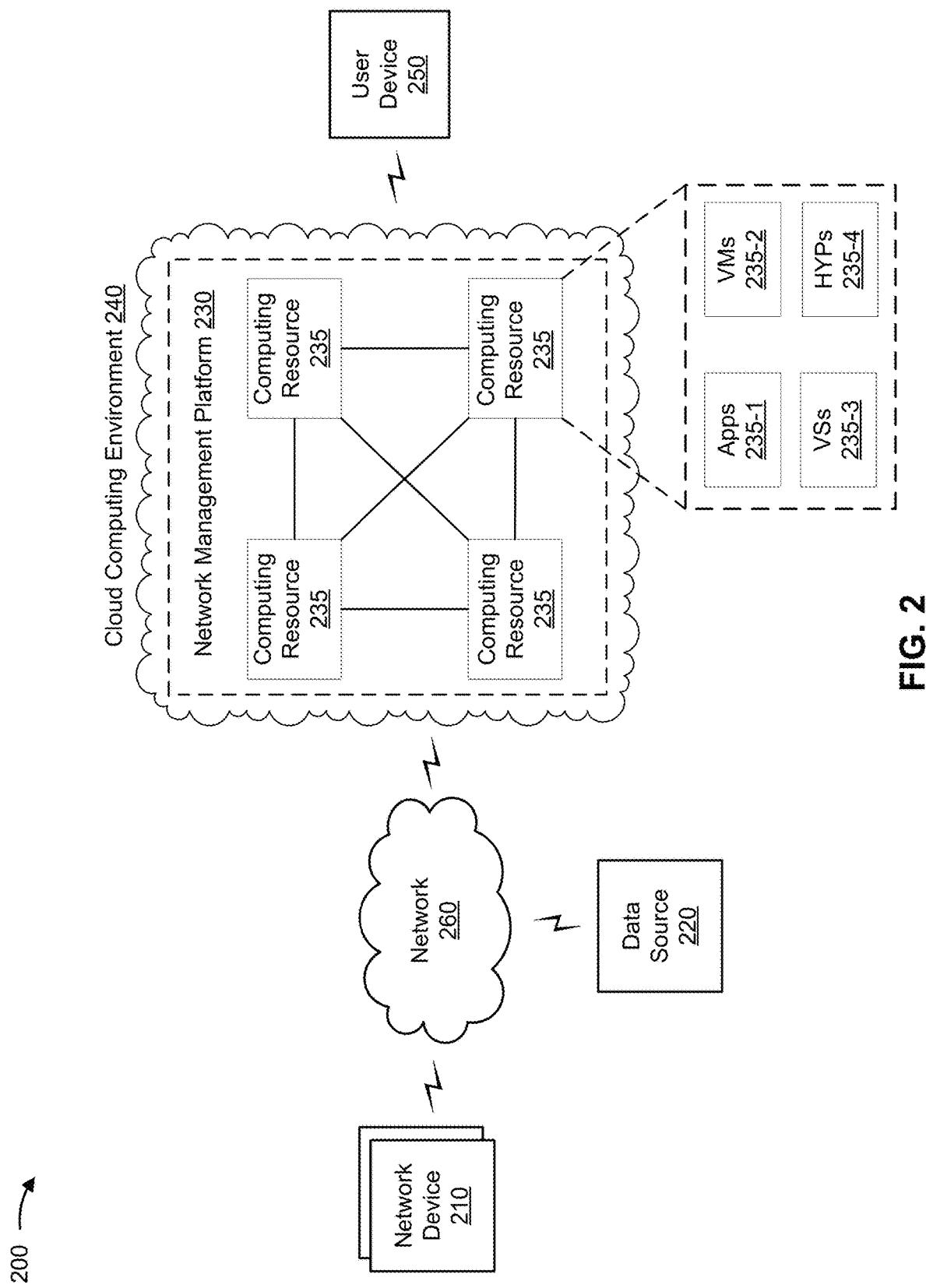
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a data source 220, a network management platform 230 hosted by a cloud computing environment 240, a user device 250, and/or a network 260. Devices of environment 200 may interconnect via wired connections, wireless connections, or a combination of wired and wireless connections.

Network device 210 includes one or more devices capable of receiving, storing, generating, processing, and/or providing network ticket information and/or performance statistics. For example, network device 210 may include a server device or a group of server devices, a router, a hub, a switch, a gateway, a repeater, a modem, a bridge, a desktop computer, a laptop computer, and/or a similar type of device. In some implementations, network device 210 may provide network ticket information and/or performance statistics to data source 220 and/or network management platform 230.

Data source 220 includes one or more devices capable of receiving, storing, and/or providing network ticket information and/or performance statistics. For example, data source 220 may include a server device or a group of server devices. In some implementations, data source 220 may receive network ticket information and/or performance statistics from network device 210, and may store the network ticket information and/or the performance statistics as historical network data. In some implementations, data source 220 may receive network ticket information and/or performance statistics for a network device that is actively supporting traffic (e.g., to be stored as historical network data). In some implementations, data source 220 may provide historical network data to network management platform 230.

Network management platform 230 includes one or more devices capable of receiving, storing, generating, processing, and/or providing information associated with managing performance of network devices 210. For example, network management platform 230 may include a server device (e.g., in a data center or a cloud computing environment), a data center (e.g., a multi-server micro data center), a workstation computer, a virtual machine (VM) provided in a cloud computing environment, or a similar type of device.

In some implementations, network management platform 230 may obtain historical network ticket information and/or performance statistics from data source 220. In some implementations, network management platform 230 may obtain or receive network ticket information and/or performance statistics from network device 210, data source 220, an intermediary device (e.g., a server device, a network device, etc.), and/or the like. In some implementations, network management platform 230 may provide a recommendation to user device 250. In some implementations, network management platform 230 may provide, to network device 210, user device 250, a device associated with a technician, and/or a robot, a set of instructions associated with improving network performance.

In some implementations, as shown, network management platform 230 may be hosted in cloud computing environment 240. Notably, while implementations described herein describe network management platform 230 as being hosted in cloud computing environment 240, in some implementations, network management platform 230 might not be cloud-based (i.e., may be implemented outside of a cloud computing environment) or might be partially cloud-based.

Cloud computing environment 240 includes an environment that hosts network management platform 230. Cloud computing environment 240 may provide computation, software, data access, storage, and/or other services that do not require end-user knowledge of a physical location and configuration of system(s) and/or device(s) that host network management platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host network management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 250. Application 235-1 may eliminate a need to install and execute the software applications on user device 250. For example, application 235-1 may include software associated with network management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 250), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

User device 250 includes one or more devices capable of receiving, generating, storing, processing, and/or providing information associated with managing performance of network devices 210. For example, user device 250 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, any combination of network devices 210, data source 220, network management platform 230, and/or user device 250 may be included in network 260. In other cases, network devices 210, data source 220, network management platform 230, and/or user device 250 may be included in different networks 260.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
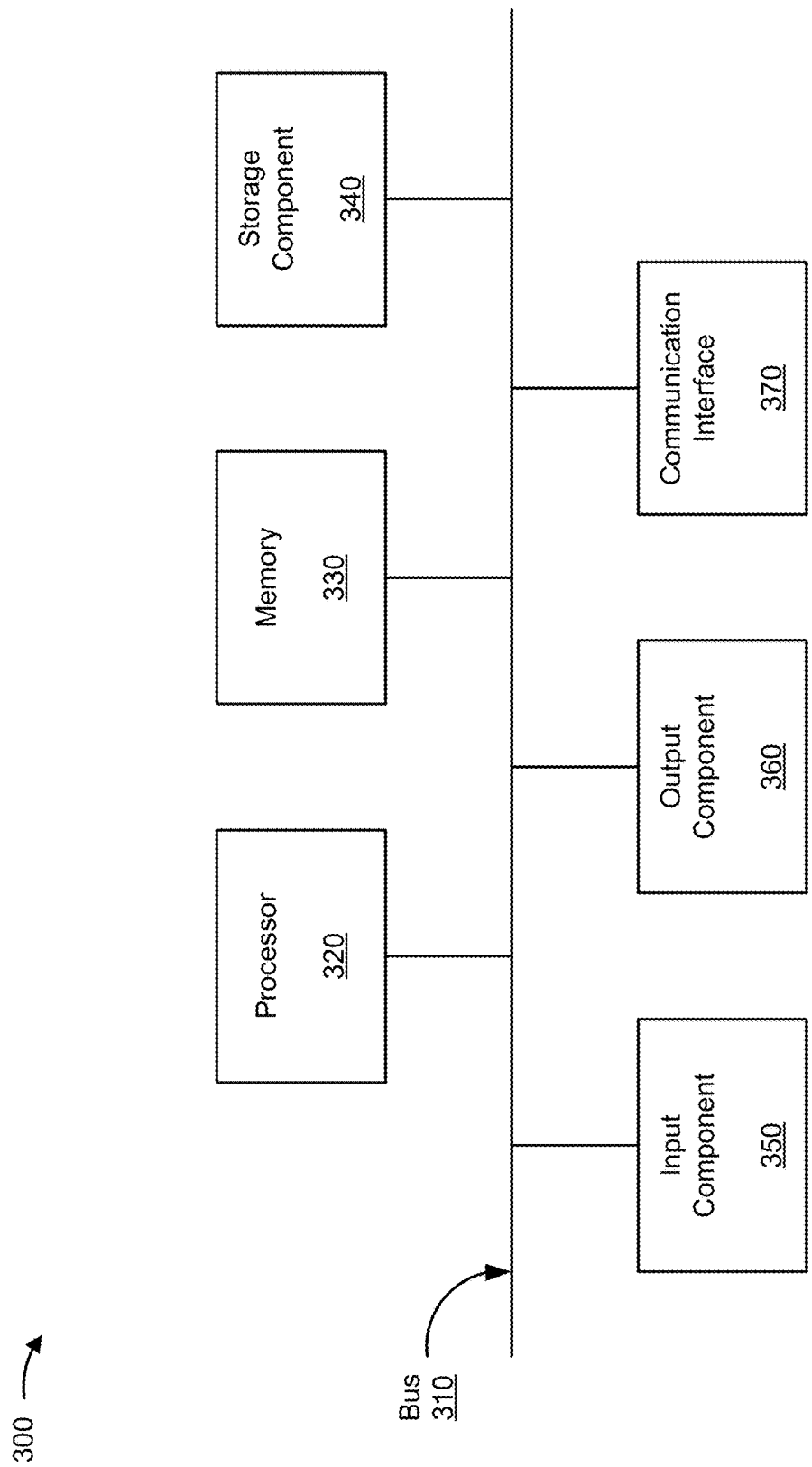
FIG. 3 is a diagram of example components of one or more devices of FIG. 2.

FIG. 3 is a diagram of example components of a device 300. Device 300 may correspond to network device 210, data source 220, network management platform 230, and/or user device 250. In some implementations, network device 210, data source 220, network management platform 230, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
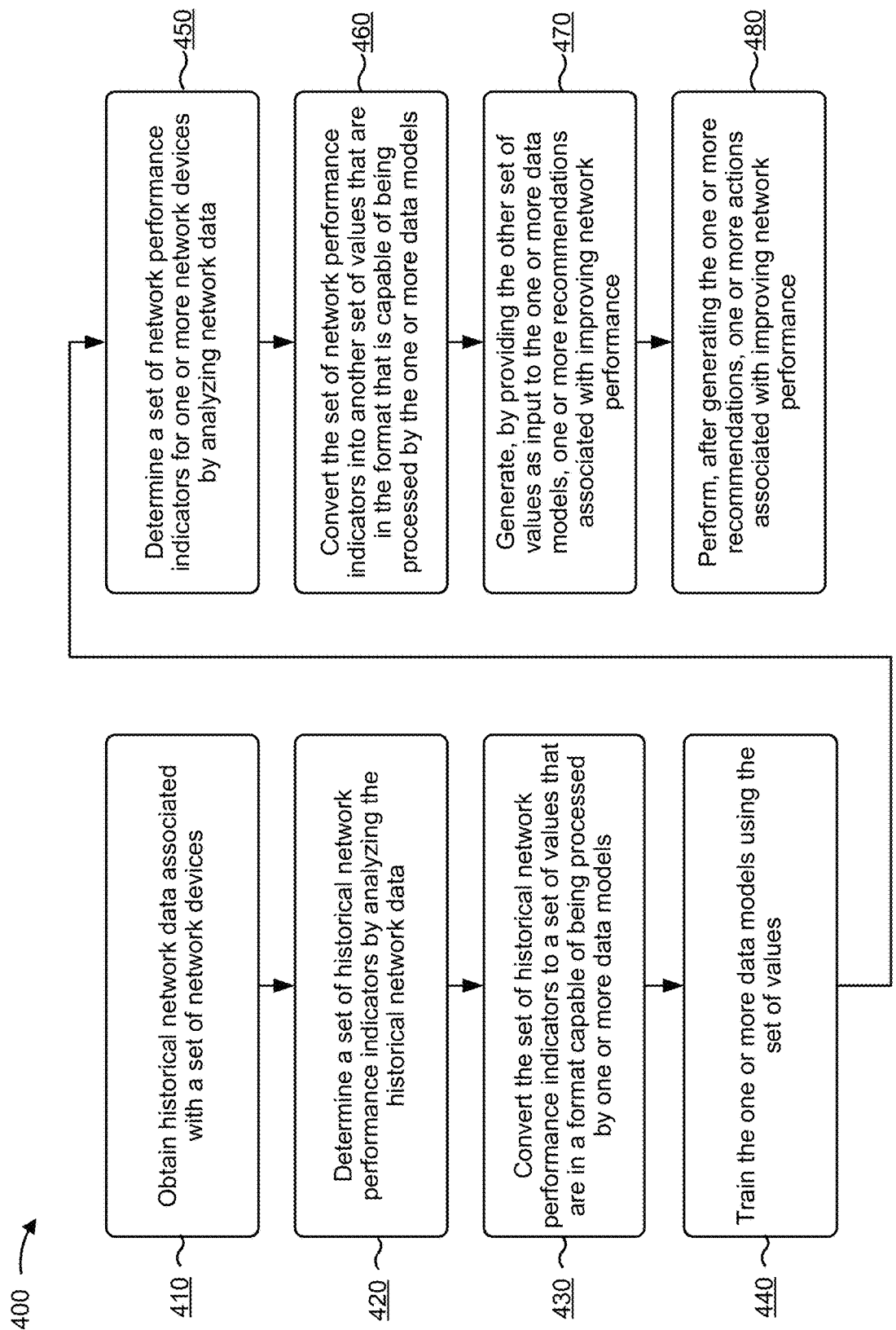
FIG. 4 is a flow chart of an example process for transforming network data into a format capable of being processed by machine learning models, and using the machine learning models to make network management decisions.

FIG. 4 is a flow chart of an example process 400 for transforming network data into a format capable of being processed by machine learning models, and using the machine learning models to make network management decisions. In some implementations, one or more process blocks of FIG. 4 may be performed by network management platform 230. In some implementations, one or more process blocks of FIG. 4 may be performed by another device or a group of devices separate from or including network management platform 230, such as network device 210, data source 220, and/or user device 250.

As shown in FIG. 4, process 400 may include obtaining historical network data associated with a set of network devices (block 410). For example, network management platform 230 may obtain, from data source 220, historical network data that includes historical network ticket information and/or historical performance statistics for a set of network devices 210.

A historical network ticket may include an event field identifying a particular performance issue, a description field describing the particular performance issue, a field indicating a time at which the historical network ticket was created and/or a time at which the performance issue occurred, a field indicating a network device identifier for a network device 210 that is a subject of the historical network ticket, a field identifying a physical location of the network device 210, and/or the like. The event field may identify a particular performance issue, such as by identifying an issue relating to packet loss, an issue relating to temperature (e.g., a component of network device 210 may be overheating, a fan may malfunction, etc.), an issue relating to latency, an issue relating to bandwidth, an issue relating to memory, and/or the like.

A historical performance statistics may include a statistic relating to performance of a network device 210, such as a statistic relating to packet loss, temperature, latency, bandwidth, memory, and/or the like.

In some implementations, prior to network management platform 230 obtaining historical network data, the set of network devices 210 may generate network tickets and/or performance statistics. For example, a network device 210, of the set of network devices 210, may utilize a set of sensors that monitors performance metrics associated with the network device 210. In this case, if a performance metric associated with a network device 210 satisfies a threshold value, then a network alarm may trigger and cause the network device 210 to create a network ticket and/or a performance statistic. In other cases, a network ticket may be created due a complaint filed by an end-user (e.g., a user experiencing a connection issue).

As an example, a network device 210 may support traffic flow for one or more network services, and a sensor hosted on the network device 210 (or otherwise associated with the network device 210) may monitor latency associated with the traffic flow. In this example, if one or more latency values recorded by the sensor satisfy a threshold latency value, a network alarm may trigger, causing the network device 210 to generate a network ticket and/or a performance statistic. Additionally, the network device 210 may provide the network ticket and/or the performance statistic to data source 220, where the network ticket and/or the performance statistic can be stored as a historical network data.

As another example, a network device 210 may support traffic flow for one or more network services, and a sensor hosted on the network device 210 may monitor temperature of one or more components of the network device 210 while the network device 210 supports traffic flow. In this example, if one or more temperature readings recorded by the sensor satisfy a threshold value, a network alarm may trigger, causing the network device 210 to generate a network ticket and/or a performance statistic, and to provide the network ticket and/or the performance statistic to data source 220.

In some implementations, data source 220 may store historical network data. For example, data source 220 may store historical network ticket information using a data structure, such as an array, a linked-list, a tree, a graph, a hash table, a database, and/or the like. In some implementations, data source 220 may store large quantities of data. For example, data source 220 may store millions, billions, or even trillions of data items. In this way, data source 220 may store a quantity of data that cannot be objectively processed by a human actor.

In some implementations, network management platform 230 may obtain historical network data. For example, network management platform 230 may obtain historical network data by querying data source 220. As another example, network management platform 230 may be configured to automatically obtain or receive historical network data, from data source 220, at a particular time period, a particular time interval, and/or the like without network management platform 230 having to query data source 220.

In this way, network management platform 230 is able to obtain historical network data.

As further shown in FIG. 4, process 400 may include determining a set of historical network performance indicators by analyzing the historical network data (block 420). For example, network management platform 230 may analyze the set of historical network tickets and/or the performance statistics to determine a set of historical network performance indicators.

The set of historical network performance indicators may include a network latency indicator, a bandwidth utilization rate indicator, a packet loss indicator, a temperature indicator, and/or the like. Additionally, a historical network performance indicator may be determined for a network device 210, for a group of network devices 210 of the set of network devices 210 (e.g., a group of network devices 210 in a particular location, such as a particular data center, a particular server rack, a group of network devices 210 of a same type, etc.), for groups of historical network tickets (e.g., an indicator may aggregate historical network tickets of the same type, historical network tickets that are of different types, etc.), for a group of historical performance indicators (e.g., an indicator may aggregate performance indicators of the same type, historical performance indicators that are of different but related types, etc.), and/or the like.

In some implementations, network management platform 230 may determine a historical network performance indicator for a particular network device 210 using historical network data obtained throughout an interval (e.g., an interval during which the historical network data was obtained, an interval between a first time and a second time, an interval covering the last minute, an interval covering the last 30 minutes, an interval covering the last hour, an interval covering the last 24 hours, etc.). For example, network management platform 230 may analyze the historical network data to identify one or more historical network tickets that were created by the network device 210 during the interval.

As an example, network management platform 230 may obtain historical network tickets with latency information, where each historical network ticket identifies a latency metric, a timestamp associated with the particular latency metric, an identifier of the network device 210, and/or the like. In this case, network management platform 230 may determine a network latency indicator by taking an average or a weighted average of the latency metrics associated with the historical network tickets. Network management platform 230 may similarly determine other types of historical network performance indicators, such as a historical packet loss indicator, a historical bandwidth utilization rate indicator, and/or the like.

Additionally, or alternatively, network management platform 230 may determine a historical network performance indicator for a group of network devices 210. For example, network management platform 230 may determine a historical network performance indicator for a group of network devices 210 that are located in a similar location, such as within a particular data center, a particular server rack, and/or the like, for a group of network devices 210 of a same type, and/or the like. In this case, network management platform 230 may determine the historical network latency indicator by determining initial historical network latency indicators for the group of network devices 210, and taking an average or a weighted average of the initial historical network latency indicators.

Additionally, or alternatively, network management platform 230 may determine a historical network performance indicator for a group of historical network tickets and/or historical performance indicators that are of different types (e.g., different ticket types or different event fields, different types of performance indicators, etc.). For example, network management platform 230 may obtain, for a network device 210 or for a group of network devices 210, historical network tickets of different ticket types or with different ticket event fields. In this case, network management platform 230 may aggregate and analyze the historical network tickets to determine the historical network performance indicator.

As an example, assume network management platform 230 obtains a first historical network ticket that identifies a forward error correction (FEC) metric associated with a network device 210. Further assume network management platform 230 obtains a second historical network ticket that identifies a cyclic redundancy check (CRC) metric associated with the network device 210. In this case, network management platform 230 may use both the first historical network ticket and the second historical network ticket to determine a historical performance indicator that considers two different metrics that are monitored by sensors of the network device 210.

In this way, network management platform 230 is able to determine historical network performance indicators for the historical network ticket information.

As further shown in FIG. 4, process 400 may include converting the set of historical network performance indicators to a set of values that are in a format capable of being processed by one or more data models (block 430). For example, network management platform 230 may convert and aggregate the set of historical network performance indicators to a set of values that are in a format capable of being processed by one or more data models (e.g., machine learning data models, artificial intelligence models, natural language processing models, etc.).

In some implementations, network management platform 230 may be configured with a set of values that are in a format capable of being processed by one or more data models. For example, a domain expert may, for each type of historical network performance indicator, associate ranges of historical network performance indicator values with particular values that are capable of being processed by a data model. In this case, the ranges of historical network performance indicator values may be based on domain expert knowledge relating to standards of performance. In this way, network management platform 230 is able to convert the historical network performance indicators into the set of values based on the ranges provided by the domain expert.

As an example, a domain expert may identify that bandwidth values for a fiber optic connection should be at least 1.5 megabytes per second (Mbps) for both uplink data and downlink data if the connection is strong. In this example, the domain expert may associate bandwidth values under 1.3 Mbps with a value of 0, bandwidth values between 1.31 Mbps and 1.49 Mbps with a value of 1, and bandwidth values of 1.50 Mbps or higher with a value of 2. In this way, network management platform 230 is able to convert each historical bandwidth utilization rate indicator based on a range that each historical bandwidth utilization rate indicator falls within.

In some implementations, network management platform 230 may receive, from user device 250, a set of values that are in a format capable of being processed by one or more data models. For example, the set of values may be configurable by a user accessing user device 250, and the user may input values based on domain knowledge, prior work experience, and/or the like.

In some implementations, network management platform 230 may use a data mining technique to determine a set of values that are in a format capable of being processed by one or more data models. For example, network management platform 230 may execute a data mining technique to analyze one or more data sources (e.g., publicly accessible webpages) to identify ranges of historical network performance indicator values that may be associated with the set of values capable of being processed by the one or more data models. In this case, network management platform 230 may, using the identified ranges of historical network performance indicator values, convert the historical network performance indicators into values that are capable of being processed by one or more data models based on a particular range of historical network performance indicator values (or a particular threshold range of historical network performance indicator values) that each historical network performance indicator falls within.

As an example, a webpage may include text describing desired bandwidth ranges for different types of connections. In this case, network management platform 230 may execute a data mining technique to analyze the webpage to identify the desired bandwidth ranges, and may convert each historical bandwidth indicator to a value that is capable of being processed by a data model based on which desired bandwidth range each historical bandwidth indicator falls within.

Additionally, or alternatively, network management platform 230 may use information recorded by sensors of the set of network devices 210 and historical network data to determine a set of values that are in a format that is capable of being processed by the one or more data models. For example, network management platform 230 may query the sensors to obtain all metrics monitored by the sensors (not just network tickets and/or performance statistics). Additionally, network management platform 230 may analyze the historical network data to determine which values associated with each historical network ticket are indicators of poor performance and/or which performance statistic values are indicators of poor performance. As such, network management platform 230 is able to determine the set of values that are in the format that is capable of being processed by the one or more data models.

As an example, assume network management platform 230 obtains all (or some) bandwidth information recorded by sensors of a set of network devices 210. Further assume network management platform 230 obtains historical network ticket information and/or historical performance statistics relating to bandwidth issues for the set of network devices 210. In this case, network management platform 230 may analyze the historical network ticket information and/or the historical performance statistics to identify bandwidth values associated with poor network performance. In this way, network management platform 230 is able to associate values included in the bandwidth information recorded by the sensors into a first range of values (e.g., associated with poor network performance, as reported by historical network tickets) and into a second range of values (e.g., any values reported by the sensors but not sent as part of historical network ticket information and/or historical performance statistics, which are likely bandwidth measurements that are in an acceptable bandwidth range). Additionally, network management platform 230 may convert the first range of values and the second range of values into values that are capable of being processed by a data model.

In some implementations, network management platform 230 may convert historical network performance indicators for an entire network. For example, network management platform 230 may determine millions, even billions of historical network performance indicators for a set of devices associated with a large network (e.g., a network extending throughout an entire country), and may convert the historical network performance indicators into a set of values capable of being processed by one or more data models. In this way, network management platform 230 is able to convert millions, even billions, of historical network performance indicators, such that a human or an inferior network management platform would not be objectively capable of processing.

In this way, network management platform 230 is able to convert the set of historical network performance indicators to a set of values capable of being processed by one or more data models.

As further shown in FIG. 4, process 400 may include training the one or more data models using the set of values (block 440). For example, network management platform 230 may train the one or more models using one or more machine learning techniques and/or artificial intelligence techniques.

In some implementations, as described herein, network management platform 230 may train a data model using a supervised machine learning technique. Additionally, or alternatively, network management platform 230 may train a data model using a different type of machine learning technique, such as machine learning via clustering, dimensionality reduction, structured prediction, anomaly detection, neutral networks, reinforcement learning, and/or the like.

In some implementations, network management platform 230 may train a data model using a location identification technique. For example, network management platform 230 may train a decision tree using a location identification technique such as a K-means clustering algorithm. In this case, the K-means clustering algorithm may allow a data model to output whether to add or remove a network device 210 from a particular location (e.g., from a server rack, from a data center, etc.).

Additionally, or alternatively, network management platform 230 may train a data model using a forecasting technique. For example, network management platform 230 may train a data model by using a forecasting technique, such as a linear regression technique, that is capable of predicting network traffic over an interval. In this case, the historical network data may include information identifying traffic flow at particular time periods, and network management platform 230 may use the information to create a data model capable of forecasting time intervals associated with high traffic volume, which may, as described herein, be used to perform one or more actions to improve network performance.

Additionally, or alternatively, network management platform 230 may train a data model using an anomaly detection technique. For example, network management platform 230 may train a data model using an anomaly detection technique that outputs a predicted time period at which an anomaly (e.g., a large spike in traffic) may occur. In some cases, an anomaly may be associated with a historical network performance indicator value that is a threshold distance away from a median historical network performance indicator value. By training a data model to identify anomalies in network traffic, network management platform 230 may predict anomalies and may, as described herein, perform one or more actions to improve network performance.

Additionally, or alternatively, network management platform 230 may train a data model using a path-finding technique. For example, network management platform 230 may train a data model using a path-finding technique (e.g., Dijkstra's algorithm, A* search algorithm, etc.) to identify traffic re-routing paths. In this case, the data model may consider a number of different routing paths, and may output information identifying a routing path that is associated with a most effective use of network resources (e.g., the algorithm may consider connection type (e.g., fiber versus microwave), network traffic, distance, etc.). In this way, the path-finding technique may be used to output recommended routing and/or re-routing paths for traffic flow between network devices 210.

Additionally, or alternatively, network management platform 230 may train a data model using one or more classification algorithms. For example, network management platform 230 may train a data model using historical network data, one or more classification algorithms (e.g., algorithms capable of classifying network data) and historical network performance indicators. A classification algorithm may be a way to compute the probability of an output (a target variable) given a set of inputs (features), and may include a neural network, a random forest, a classification tree, and/or the like. In this case, the data model may take live network performance indicators as input, and may output a value indicating a likelihood of a network fault occurring.

In some implementations, network management platform 230 may test a data model. For example, network management platform 230 may provide, as input to the data model, test data (e.g., additional historical network data) to determine whether the data model satisfies a threshold level of accuracy. In this case, values included in the test data may be associated with a particular recommendation, and network management platform 230 may test the data model using the test data to determine whether output of the data model satisfies the threshold level of accuracy.

In some implementations, network management platform 230 may receive one or more data models that have been trained using a set of values that are in a format capable of being processed by the one or more data models. For example, network management platform 230 may receive, from another server device, from a device associated with a software developer, and/or the like, one or more data models that have been trained. In this way, a device other than network management platform 230 may train the one or more data models, and may provide the one or more data models to network management platform 230.

In some implementations, network management platform 230 may receive one or more data models that have been trained on supplemental information. The supplemental information may include subscription information for user devices in a geographic region, location information of a set of host servers for commonly used network services (e.g., a server hosting a commonly used social media platform), and/or the like. In this case, network management platform 230 may train the one or more data models using the supplemental information, one or more of the above described techniques, the set of values that are in the format that is capable of being processed by the one or more data models, and/or the like.

In some cases, network management platform 230 may use the supplemental information as part of locally training the one or more data models, in the same manner described above.

In this way, network management platform 230 is able to train one or more data models that may be used to process real-time network ticket data.

As further shown in FIG. 4, process 400 may include determining a set of network performance indicators for one or more network devices by analyzing network data (block 450). For example, network management platform 230 may receive a set of network tickets and/or performance statistics (collectively referred to as network data) associated with one or more network devices 210, while the set of network devices 210 are actively supporting traffic flow, and may analyze the network data to determine a set of network performance indicators.

The set of network tickets may include information identifying a particular performance issue of a network ticket, such as by identifying an issue relating to packet loss, an issue relating to temperature (e.g., temperature of a component of a network device 210), an issue relating to latency, an issue relating to bandwidth, an issue relating to memory, and/or the like. The set of network performance indicators may include a network latency indicator, a bandwidth utilization rate indicator, a packet loss indicator, a temperature indicator, and/or the like. The performance statistics may include statistics relating to performance of a network device 210, such as a statistic relating to packet loss, temperature, latency, bandwidth, memory, and/or the like.

In some implementations, network management platform 230 may receive the network data. For example, network management platform 230 may receive the network data automatically from network devices 210, data source 220, one or more intermediary devices, and/or the like. In some implementations, network management platform 230 may obtain the network data (e.g., by providing a query that requests the network data to one or more of the above-mentioned devices).

In some implementations, network management platform 230 may determine the set of network performance indicators, in the same manner described above. For example, network management platform 230 may determine a first group of network performance indicators that include indicators associated with each network device 210, may determine a second group of network performance indicators associated with the one or more network devices 210 (or subsets of the one or more network devices 210), may determine a third group of network performance indicators associated with aggregating different types of network data, and/or the like.

In some implementations, network management platform 230 may determine the set of network performance indicators based on a trigger, such as a timer. For example, network management platform 230 may obtain network data throughout an interval and, at the end of the interval (e.g., the expiration of a timer), may determine the set of network performance indicators based on all (or some) of the data collected during the interval.

In this way, network management platform 230 is able to determine a set of network performance indicators.

As further shown in FIG. 4, process 400 may include converting the set of network performance indicators into another set of values that are in the format capable of being processed by the one or more data models (block 460). For example, network management platform 230 may convert the set of network performance indicators in the same manner described above (see, e.g., block 430).

In this way, network management platform 230 is able to convert the set of network performance indicators into another set of values that are in the format that is capable of being processed by the one or more data models.

As further shown in FIG. 4, process 400 may include generating, by providing the other set of values as input to the one or more data models, one or more recommendations associated with improving network performance (block 470). For example, network management platform 230 may provide the other set of values as input to the one or more data models, which may cause the one or more data models to output values that may be used to generate one or more recommendations that may be implemented to improve network performance. The one or more recommendations may include a recommendation to modify a number of network devices 210 used to support traffic flow, to allocate resources to a network device 210 or from the network device 210, to allocate resources between network devices 210, to route or reroute traffic between network devices 210, and/or the like.

In some implementations, network management platform 230 may generate a recommendation to add or remove a network device 210. For example, assume a data model has been trained using the set of values and a location identification technique. In this case, network management platform 230 may provide the set of network performance indicators as input to the data model, which may cause the data model to output a value associated with a recommendation to add a network device 210 to a particular location or to remove the network device 210 from the particular location.

As an example, if the set of network performance indicators for a group of network devices 210 include network performance indicators identifying a large amount of packet loss, latency, bandwidth usage, and/or the like, the data model may output a value associated with a recommendation to add a network device 210 to a particular location, thereby reducing an amount of traffic flow that nearby network devices 210 have to handle.

Additionally, or alternatively, network management platform 230 may generate a recommendation to allocate resources between network devices 210. For example, network management platform 230 may generate a recommendation to allocate additional resources to a network device 210, remove excess resources from a network device 210, take resources from a first network device 210 and allocate the resources to a second network device 210, and/or the like. In this case, a data model may be trained using a machine learning technique, such as a forecasting technique, a path-finding technique, an anomaly detection technique, and/or the like. In this case, network management platform 230 may provide the set of network performance indicators as input to the data model, which may cause the data model to output a value associated with a recommendation to allocate resources between network devices 210.

As an example, if network performance indicators for a first group of network devices 210 include network performance indicators identifying a large amount of packet loss, latency, bandwidth usage, and/or the like, and if network performance indicators for a second group of network devices 210 include network performance indicators identifying a low amount of packet loss, latency, bandwidth usage, and/or the like, then network management platform 230 may output a value associated with a recommendation to allocate resources by removing resources from the second group of network devices 210 and reallocating the resources to the first group of network devices 210.

Additionally, or alternatively, network management platform 230 may generate a recommendation to route or reroute traffic between network devices 210. For example, network management platform 230 may generate a recommendation to route traffic away from a particular network device 210, route additional traffic to a particular network device 210, reroute traffic going to a first network device 210 so that the traffic is routed to a second network device 210, and/or the like. In this case, a data model may be trained using a path-finding technique (e.g., Dijkstra's algorithm, A* search algorithm, etc.). Additionally, network management platform 230 may provide the set of network performance indicators as input to the data model, which may cause the data model to output a recommendation to route or reroute traffic between network devices 210.

Additionally, or alternatively, network management platform 230 may generate a recommendation based on a forecast of network traffic. For example, assume a data model has been trained using a set of historical network performance indicators and a forecasting technique (e.g., a linear regression algorithm). In this case, network management platform 230 may provide network performance indicators as input for the data model, which may cause the data model to output a prediction relating to an amount of network traffic, a prediction relating to status of one or more network devices 210, and/or the like. In some cases, the prediction may be a prediction of when a new network ticket will open. Additionally, network management platform 230 may use the one or more predictions to generate a recommendation to add network devices 210 to or remove network devices 210 from a particular location, to recommend one or more traffic routing and/or rerouting paths, and/or the like.

Additionally, or alternatively, network management platform 230 may generate a recommendation to perform maintenance on a network device 210. For example, network management platform 230 may generate a recommendation to perform maintenance on a network device 210 using one or more of the above-described techniques and/or methods.

In this way, network management platform 230 is able to generate one or more recommendations associated with improving network performance.

As further shown in FIG. 4, process 400 may include performing, after generating the one or more recommendations, one or more actions associated with improving network performance (block 480). For example, network management platform 230 may perform one or more actions to improve network performance or to allow another device or party to improve network performance. The one or more actions may include providing the one or more recommendations for display on user device 250, providing instructions to automatically implement the one or more recommendations, automatically implementing the one or more recommendations, and/or the like.

In some implementations, network management platform 230 may provide a recommendation to user device 250. For example, network management platform 230 may provide a recommendation for display on a user interface of user device 250 to allow a user to view the recommendation. In some cases, network management platform 230 may provide additional information relating to the recommendation. For example, if a recommendation is to add a network device 210 to a particular server rack or data center, network management platform 230 may also provide cost information relating to purchasing and installation of the network device 210, should the user decide to implement the recommendation.

Additionally, or alternatively, network management platform 230 may provide one or more instructions associated with adding or removing a network device 210. For example, network management platform 230 may provide an instruction to a device associated with a technician to add or remove a network device 210. The instruction may include information identifying the network device 210 that is to be added or removed, information identifying the particular location of which the network device 210 is to be added to or removed from, information associated with a set of installation or uninstallation instructions, and/or the like.

Furthermore, network management platform 230 may use information included in the request to analyze technician information, such as a set of electronic calendars associated with accounts of technicians, technician schedule information identifying whether a technician is available, technician qualification information including a set of credentials associated with qualifications of each technician, technician location information, and/or the like, and may select an available technician to add or remove the network device 210. Moreover, network management platform 230 may provide an e-mail to a device associated with the technician, schedule an appointment in a calendar of the technician, and/or the like.

Additionally, or alternatively, network management platform 230 may automatically modify resources assigned to one or more network devices 210. For example, network management platform 230 may use an application programming interface (API) to interact with one or more network devices 210 that are targeted for resource allocation. In this case, network management platform 230 may add virtual resources to a network device 210, remove virtual resources from a network device 210, take virtual resources from a first network device 210 and allocate them to a second network device 210, and/or the like. Additionally, or alternatively, network management platform 230 may use an API to automatically power up a network device 210 and bring the network device 210 online (e.g., without input from a technician).

Additionally, or alternatively, network management platform 230 may provide instructions to a robot to automatically implement a recommendation. For example, network management platform 230 may generate a recommendation to add a network device 210 to a particular location or to remove the network device 210 from the particular location. The recommendation may include information identifying the network device 210 that is to be added or removed, information identifying the particular location, information associated with a set of installation or uninstallation instructions, and/or the like. In this case, network management platform 230 may provide the recommendation to the robot to cause the robot to automatically add the network device 210 or to automatically remove the network device 210. For example, the robot may use one or more mechanical appendages to physically plug in cables or unplug cables needed to power on the network device 210 or connect the network device 210 to a network, may install an operating system and/or software on the network device 210, and/or the like.

In this way, network management platform 230 is able to perform one or more actions associated with improving network performance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using machine learning to generate recommendations that may be implemented to improve network performance, network management platform 230 conserves network resources by determining an efficient and effective allocation of resources. Furthermore, network management platform 230 conserves processing resources by predicting and preventing network faults. For example, by predicting a network fault (e.g., a server crashing, a threshold amount of packet loss occurring, etc.), and performing preventative measures needed to ensure that the network fault never occurs, network management platform 230 conserves processing resources that might otherwise be used to fix the network fault in real-time, processing resources that might be used to reallocate network resources during the network fault, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors communicatively coupled to the one or more memories to:
  obtain historical network data associated with a set of network devices,
    the historical network data being associated with a first set of values that are in a format capable of being processed by one or more data models, and
    the historical network data including at least one of:
      historical network ticket information, or
      historical performance statistics relating to the set of network devices;
  determine a set of historical network performance indicators for one or more groups of network devices, of the set of network devices, by analyzing the historical network data;
  train the one or more data models based on the set of historical network performance indicators;
  receive, after training the one or more data models, new network data for one or more network devices of the set of network devices,
    the new network data being received periodically over an interval and including at least one of:
      network ticket information, or
      performance statistics relating to the one or more network devices;
  determine a set of other network performance indicators that are associated with the one or more network devices, of the set of network devices, by analyzing the new network data;
  convert the set of other network performance indicators into a second set of values that are in the format capable of being processed by the one or more data models,
    wherein the one or more processors, when converting the set of other network performance indicators into the second set of values, are to:
      execute a data mining technique to identify, by analyzing information associated with a set of data sources, a set of threshold ranges of values, the set of threshold ranges of values being associated with a network performance indicator of the set of other network performance indicators;
      compare the network performance indicator, of the set of other network performance indicators, to the set of threshold ranges of values; and
      convert the network performance indicator to a value included in the second set of values based on a particular threshold range of values, of the set of threshold ranges of values, with which the network performance indicator is associated;
  generate, based on the set of other network performance indicators and the one or more data models, one or more recommendations associated with improving network performance; and
  perform, based on the one or more recommendations, one or more actions associated with improving network performance.

2. The device of claim 1, where the historical network ticket information is associated with a set of historical network tickets, and
where the network ticket information is associated with a set of network tickets,
where each historical network ticket of the set of historical network tickets and each network ticket of the set of network tickets includes at least one of:
a first field identifying a particular performance issue of a network device of the set of network devices,
a second field describing the particular performance issue,
a third field indicating a time at which a historical network ticket of the set of historical network tickets or a network ticket of the set of network tickets was created, or
a fourth field indicating a network device identifier for the network device.

3. The device of claim 1, where the one or more processors are further to:
convert the set of historical network performance indicators to the first set of values that are in the format capable of being processed by the one or more data models; and
where the one or more processors, when training the one or more data models, are to:
train the one or more data models using the first set of values.

4. The device of claim 1, where the one or more processors, when training the one or more data models, are to:
train the one or more data models using one or more machine learning or artificial intelligence techniques.

5. The device of claim 1, where the one or more processors, when training the one or more data models, are to:
train a data model of the one or more data models with the first set of values and at least one of:
a location identification technique,
a path-finding technique, or
a forecasting technique,
where the location identification technique, the path-finding technique, or the forecasting technique includes a set of rules that allow the device to process the first set of values.

6. The device of claim 1,
where the one or more processors, when generating the one or more recommendations, are to:
generate the one or more recommendations by providing the second set of values as input to the one or more data models.

7. The device of claim 1, where the one or more processors, when generating the one or more recommendations, are to:
generate a recommendation, of the one or more recommendations, to reroute traffic flow from a first network device of the set of network devices to a second network device of the set of network devices; and
where the one or more processors, when performing the one or more actions, are to:
modify, using an application programming interface (API), one or more network routing paths to allow the traffic flow to be rerouted based on the recommendation.

8. A method, comprising:
receiving, by a device, one or more data models that have been trained using a first set of values that are in a format capable of being processed by the one or more data models,
the first set of values being associated with a set of historical network performance indicators that relate to a set of network devices;
receiving, by the device, network data for one or more network devices of the set of network devices,
the network data including network ticket information and performance statistics relating to the one or more network devices;
determining, by the device, a set of other network performance indicators that are associated with the one or more network devices by analyzing the network data;
converting, by the device, the set of other network performance indicators into a second set of values that are in the format capable of being processed by the one or more data models,
wherein converting the set of other network performance indicators into the second set of values comprises:
executing a data mining technique to identify, by analyzing information associated with a set of data sources, a set of threshold ranges of values,
the set of threshold ranges of values being associated with a network performance indicator of the set of other network performance indicators,
comparing the network performance indicator to the set of threshold ranges of values, and
converting the network performance indicator to a value included in the second set of values based on a particular threshold range of values, of the set of threshold ranges of values, with which the network performance indicator is associated;
generating, by the device and by providing the second set of values as input to the one or more data models, one or more recommendations associated with improving network performance; and
performing, by the device and based on the one or more recommendations, one or more actions associated with improving network performance.

9. The method of claim 8, where receiving the network data comprises:
receiving the network data for the one or more network devices,
where the network data is reported periodically over an interval; and
where determining the set of other network performance indicators comprises:
determining a first group of other network performance indicators associated with each network device of the one or more network devices, and
determining a second group of other network performance indicators associated with the one or more network devices.

10. The method of claim 8, where converting the set of other network performance indicators into the second set of values comprises:
converting the set of other network performance indicators into the second set of values, where the first set of values is configurable by a user.

11. The method of claim 8, where receiving the one or more data models comprises:
receiving a data model, of the one or more data models, that has been trained using the set of historical network performance indicators and a forecasting technique;
where generating the one or more recommendations comprises:
generating a recommendation of the one or more recommendations, the recommendation including information predicting a time period at
which a new network ticket will be opened; and
where performing the one or more actions comprises:
performing an action associated with correcting a performance issue of a network device, of the set of network devices, prior to the new network ticket being opened.

12. The method of claim 8, where generating the one or more recommendations comprises:
generating a recommendation, of the one or more recommendations, to allocate virtual resources assigned to a first network device of the set of network devices to a second network device of the set of network devices; and
where performing the one or more actions comprises:
removing, using an application programming interface (API), the virtual resources from the first network device of the set of network devices, and
adding, using the API, the virtual resources to the second network device of the set of network devices.

13. The method of claim 8, where generating the one or more recommendations comprises:
generating a recommendation, of the one or more recommendations, to add a first network device to a first location or to remove a second network device, of the set of network devices, from a second location,
the recommendation including:
information identifying the first network device or the second network device,
information identifying the first location or the second location, and
information associated with a set of installation or uninstallation instructions; and
where performing the one or more actions comprises:
analyzing, using information included in the recommendation, a data source that stores technician information to identify an available technician,
the technician information including:
technician schedule information identifying whether a technician is available,
technician location information, and
technician qualification information indicating one or more credentials of the technician, and
scheduling an appointment to an electronic calendar of an account associated with the available technician to allow the available technician to implement the recommendation.

14. The method of claim 8, where performing the one or more actions comprises:
providing at least one of the one or more recommendations for display.

15. A non-transitory computer-readable medium storing instructions, the instructions comprising:
one or more instructions that, when executed by one or more processors, cause the one or more processors to:
receive one or more data models that have been trained using one or more machine learning techniques and a first set of values that are in a format capable of being processed by the one or more data models,
the first set of values being associated with a set of historical network performance indicators that relate to a set of network devices;
receive network data for one or more network devices of the set of network devices,
the network data including at least one of:
network ticket information relating to the one or more network devices, or
performance statistics relating to the one or more network devices;
determine a set of other network performance indicators that are associated with the one or more network devices, of the set of network devices, by analyzing the network data;
convert the set of other network performance indicators into a second set of values that are in the format capable of being processed by the one or more data models,
wherein the one or more instructions, that cause the one or more processors to convert the set of other network performance indicators into the second set of values, cause the one or more processors to:
execute a data mining technique to identify, by analyzing information associated with a set of data sources, a set of threshold ranges of values, the set of threshold ranges of values being associated with a network performance indicator of the set of other network performance indicators,
compare the network performance indicator, of the set of other network performance indicators, to the set of threshold ranges of values, and
convert the network performance indicator to a value included in the second set of values based on a particular threshold range of values, of the set of threshold ranges of values, with which the network performance indicator is associated;
generate, by providing the second set of values as input to the one or more data models, one or more recommendations associated with improving network performance,
the one or more recommendations including at least one of:
a first recommendation to modify a number of network devices used to support traffic flow,
a second recommendation to modify an allocation of resources associated with at least one of the one or more network devices, or
a third recommendation to reroute traffic flow associated with the set of network devices; and
perform, based on the one or more recommendations, one or more actions associated with improving network performance.

16. The non-transitory computer-readable medium of claim 15, where the one or more instructions, that cause the one or more processors to receive the one or more data models, cause the one or more processors to:
receive the one or more data models,
where the one or more data models are trained on supplemental information,
the supplemental information including:
subscription information for user devices in a geographic region, or location information of a set of host servers; and
where the one or more instructions, that cause the one or more processors to generate the one or more recommendations, cause the one or more processors to:
generate the one or more recommendations based on the supplemental information.

17. The non-transitory computer-readable medium of claim 15, where the one or more instructions, that cause the one or more processors to receive the one or more data models, cause the one or more processors to:

receive a data model, of the one or more data models, that has been trained using one or more historical network performance indicators of set of historical network performance indicators and an anomaly detection technique; and where the one or more instructions, that cause the one or more processors to generate the one or more recommendations, cause the one or more processors to:

generate the first recommendation, the second recommendation, or the third recommendation based on information identifying a time at which an anomaly is likely to occur, the anomaly being associated with a spike in network traffic.

18. The non-transitory computer-readable medium of claim 15, where the one or more instructions, that cause the one or more processors to convert the set of other network performance indicators into the second set of values, cause the one or more processors to:

analyze, prior to comparing the network performance indicator to the set of threshold ranges of values, historical network ticket information using a natural language processing technique, and determine the set of threshold ranges of values based on analyzing the historical network ticket information.

19. The non-transitory computer-readable medium of claim 15, where the one or more instructions, that cause the one or more processors to generate the one or more recommendations, cause the one or more processors to:

generate the third recommendation to reroute traffic flow associated with the set of network devices, the third recommendation to reroute traffic flow including information predicting that a particular network device will open up a new network ticket at a particular time period; and where the one or more instructions, that cause the one or more processors to perform the one or more actions, cause the one or more processors to:

modify, using an application programming interface (API), one or more network routing paths to allow the traffic flow to be rerouted based on the third recommendation.

20. The non-transitory computer-readable medium of claim 15, where the one or more instructions, that cause the one or more processors to perform the one or more actions, cause the one or more processors to:

provide at least one of the one or more recommendations for display.

* * * * *